(«12») United States Patent
Chen et al.

(10) Patent No.: US 9,565,238 B2
(45) Date of Patent: Feb. 7, 2017

(54) METHOD FOR CONTROLLING ELECTRONIC APPARATUS, HANDHELD ELECTRONIC APPARATUS AND MONITORING SYSTEM

(71) Applicant: Tatung Company, Taipei (TW)

(72) Inventors: An-Yi Chen, Taipei (TW); Chia-Wei Kang, Taipei (TW); Tsung-Sheng Kuo, Taipei (TW)

(73) Assignee: Tatung Company, Taipei (TW)

( * ) Notice: Subject to any disclaimer, the term of this patent is extended or adjusted under 35 U.S.C. 154(b) by 225 days.

(21) Appl. No.: 14/279,324

(22) Filed: May 16, 2014

(65) Prior Publication Data

US 2015/0100803 A1 Apr. 9, 2015

(30) Foreign Application Priority Data

Oct. 4, 2013 (TW) .............................. 102136046 A

(51) Int. Cl.

| | |
|---|---|
| *G06F 1/00* | (2006.01) |
| *H04L 29/08* | (2006.01) |
| *G06F 11/00* | (2006.01) |
| *H04L 12/28* | (2006.01) |
| *H04L 29/06* | (2006.01) |
| *H04M 1/725* | (2006.01) |
| *H04W 4/04* | (2009.01) |

(Continued)

(52) U.S. Cl.
CPC ............. *H04L 67/025* (2013.01); *G06F 3/011* (2013.01); *G06F 3/0488* (2013.01); *G06F 11/00* (2013.01); *H04L 12/28* (2013.01); *H04L 12/2814* (2013.01); *H04L 67/38* (2013.01); *H04M 1/72533* (2013.01); *H04W 4/043* (2013.01); *H04L 2012/2841* (2013.01); *H04M 2250/52* (2013.01)

(58) Field of Classification Search
CPC ................................. G06F 1/266; G06F 3/048
USPC ........................................... 713/320; 715/740
See application file for complete search history.

(56) References Cited

U.S. PATENT DOCUMENTS

| 2011/0115816 A1* | 5/2011 | Brackney | ............... G06Q 10/06 345/629 |
| 2012/0105447 A1* | 5/2012 | Kim | ................. H04N 21/42226 345/419 |

(Continued)

FOREIGN PATENT DOCUMENTS

| TW | 201136300 | 10/2011 |
| TW | 201246963 | 11/2012 |
| TW | M441280 | 11/2012 |

OTHER PUBLICATIONS

"Office Action of Taiwan Counterpart Application", issued on Oct. 22, 2015, p. 1-p. 11, in which the listed references were cited.

*Primary Examiner* — Zahid Choudhury
(74) *Attorney, Agent, or Firm* — Jianq Chyun IP Office

(57) ABSTRACT

A method for controlling an electronic apparatus, a handheld electronic apparatus, and a monitoring system are provided. An image within an image capturing range is displayed on a display unit by an image capturing unit. A digital stamp in the image is detected. The digital stamp corresponds to a single or multiple controllable devices. A control interface corresponding to the digital stamp is displayed on the image. An operation action a user executes on the control interface is detected so as to control the controllable device corresponding to the digital stamp.

12 Claims, 3 Drawing Sheets

(51) Int. Cl.
*G06F 3/0488* (2013.01)
*G06F 3/01* (2006.01)

(56) References Cited

U.S. PATENT DOCUMENTS

| | | | | |
|---|---|---|---|---|
| 2012/0268286 A1* | 10/2012 | Jin | H04L 12/2807 | 340/815.4 |
| 2012/0284652 A1* | 11/2012 | Kuo | H04L 12/2827 | 715/760 |
| 2014/0095924 A1* | 4/2014 | Holden | H04L 12/1868 | 714/4.11 |

* cited by examiner

METHOD FOR CONTROLLING ELECTRONIC APPARATUS, HANDHELD ELECTRONIC APPARATUS AND MONITORING SYSTEM

CROSS-REFERENCE TO RELATED APPLICATION

This application claims the priority benefit of Taiwan application serial no. 102136046, filed on Oct. 4, 2013. The entirety of the above-mentioned patent application is hereby incorporated by reference herein and made a part of this specification.

BACKGROUND OF THE INVENTION

Field of the Invention

The invention relates to a method for controlling an electronic apparatus and an apparatus thereof, and particularly relates to a method for controlling an electronic apparatus, a handheld electronic apparatus, and a monitoring system based on the technology of augmented reality (AR).

Description of Related Art

With the progress of technology, achievements in various techniques (such as computer graphics technology, computer simulation technology, artificial intelligence, sensor technology, display technology, and network parallel processing) have been integrated to develop virtual reality (VR). Virtual reality utilizes techniques such as computer graphics and image synthesis and uses computers to simulate the real environment so as to construct a virtual world. Typically, the user can operate objects in the virtual reality with use of equipment, such as a head-mounted display and three-dimensional (3D) sensing gloves, etc. Now more and more digital museums and companies are adopting the technology of virtual reality for information communication and display.

In recent years, the technology of augmented reality (AR) has become mature as well and is now the popular display technology among domestic and foreign enterprises. Augmented reality is a combination of the real world image and virtual objects. Such a technique is provided for integrating the virtual world into the real world on a screen to achieve interaction, such that the user can extend perceptual experience through interaction with the virtual objects. Compared with virtual reality, augmented reality is closer to the reality. Therefore, application of augmented reality has become an important part of the current research.

SUMMARY OF THE INVENTION

The invention provides a method for controlling an electronic apparatus, a handheld electronic apparatus, and a monitoring system, utilizing an image instantly captured by the handheld electronic apparatus in combination with technology of augmented reality (AR) to achieve real-time interaction.

A method for controlling an electronic apparatus according to the invention is adapted for a handheld electronic apparatus. This method includes: displaying an image within an image capturing range on a display unit by an image capturing unit; detecting a digital stamp in the image, wherein the digital stamp corresponds to a single or a plurality of controllable devices; displaying a control interface corresponding to the digital stamp at a position of the image, which corresponds to the digital stamp; and detecting an operation action the user executes on the control interface, so as to control the controllable device corresponding to the digital stamp.

In an embodiment of the invention, in a situation that the digital stamp corresponds to a plurality of controllable devices in a designated space, the step of detecting the operation action the user executes on the control interface includes: simultaneously controlling the controllable devices according to the operation action executed on the control interface belonging to the designated space.

In an embodiment of the invention, in a situation that the digital stamp corresponds to a plurality of controllable devices in a designated space, and after the step of detecting the operation action the user executes on the control interface, the image and a space frame corresponding to the designated space are simultaneously displayed when it is detected that the operation action is an action of entering the designated space.

In an embodiment of the invention, when it is detected that the operation action is an action of entering the designated space, a remote image capturing unit corresponding to the designated space is further connected to obtain the space frame via the remote image capturing unit.

In an embodiment of the invention, the control interface is a power consumption information pattern. The following situations are further included after the step of detecting the operation action the user executes on the control interface. When it is detected that the operation action is a start action, an enabling command is generated to enable power supply to the controllable device. When it is detected that the operation action is a shutdown action, a disabling command is generated to disable power supply to the controllable device. When it is detected that the operation action is a power adjustment action, a power dispatch command is generated to adjust power consumption of the controllable device.

In an embodiment of the invention, the power adjustment action is to drag the power consumption information pattern to overlay another power consumption information pattern, so that the power consumption of the controllable device corresponding to the power consumption information pattern is dispatched to the controllable device corresponding to the another power consumption information pattern. Or, the power adjustment action is to reduce or enlarge the power consumption information pattern, so as to decrease or increase the power consumption of the controllable device corresponding to the power consumption information pattern. In addition, the shutdown action is to remove the power consumption information pattern, so as to disable power supply to the controllable device corresponding to the power consumption information pattern. Moreover, after the step of removing the power consumption information pattern, when it is detected that the start action is to add the power consumption information pattern, an enabling command is generated so as to enable power supply to the controllable device corresponding to the power consumption information pattern.

In an embodiment of the invention, after the step of detecting the operation action the user executes on the control interface, a command is generated and transmitted to a server for the server to control the controllable device according to the command.

In an embodiment of the invention, after the step of detecting the operation action the user executes on the control interface, a command is generated and transmitted to the controllable device for the controllable device to execute a corresponding action according to the command.

A handheld electronic apparatus of the invention includes: a display unit, an image capturing unit, a communication unit, and a processing unit. The processing unit is coupled to the display unit, the image capturing unit, and the communication unit. The image capturing unit is used to display an image within an image capturing range on the display unit. The communication unit is used to communicate with a controllable device. The processing unit detects a digital stamp in the image, wherein the digital stamp corresponds to a single or a plurality of controllable devices, and displays a control interface corresponding to the digital stamp at a position of the image corresponding to the digital stamp and detects an operation action the user executes on the control interface, so as to control the controllable device corresponding to the digital stamp via the communication unit.

A monitoring system of the invention includes: a plurality of controllable devices, a handheld electronic apparatus, and a server. Each of the controllable devices has a digital stamp. The handheld electronic apparatus displays an image within an image capturing range on a display unit by an image capturing unit. The server receives the image from the handheld electronic apparatus via the Internet. The server detects the digital stamp in the image and displays a control interface corresponding to the digital stamp on the image of the display unit of the handheld electronic apparatus via the Internet. Further, the handheld electronic apparatus receives an operation action the user executes on the control interface and transmits the operation action to the server for the server to generate a command according to the operation action, so as to control the controllable devices.

Based on the above, in the aforementioned embodiments, real-time image overlaying and interactive operation of augmented reality (AR) are introduced to effectively combine the real scenes with virtual objects (control interface) so as to achieve a more user-friendly interface for intellectual instant operations.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The invention provides a method for controlling an electronic apparatus, a handheld electronic apparatus, and a monitoring system, which utilize the concept and technology of augmented reality (AR) to transfer controllable devices into virtual objects to be combined with real objects in the scene, and through direct or indirect communication connection between the handheld electronic apparatus and various electronic apparatuses in the environment, to construct the monitoring system that is 3D visualized and has interactive operation interface. In order to make the invention more comprehensible, embodiments are described below as examples to prove that the invention can actually be realized.

Figure 1:
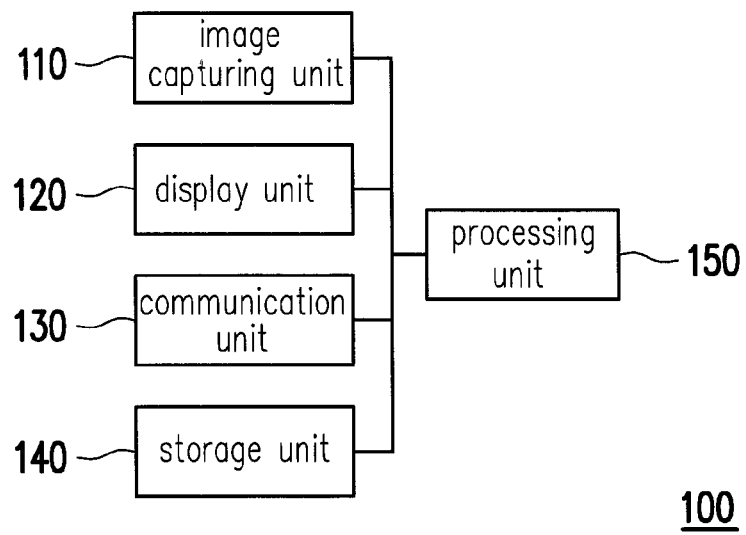
FIG. 1 is a block diagram of a handheld electronic apparatus according to an embodiment of the invention.

FIG. 1 is a block diagram of a handheld electronic apparatus according to an embodiment of the invention. With reference to FIG. 1, a handheld electronic apparatus 100 includes an image capturing unit 110, a display unit 120, a communication unit 130, a storage unit 140, and a processing unit 150. The processing unit 150 is coupled to the image capturing unit 110, the display unit 120, the communication unit 130, and the storage unit 140.

The image capturing unit 110 is a video camera or a camera that uses a CCD (charge coupled device) lens, a CMOS (complementary metal oxide semiconductor transistors) lens, or an infrared lens, etc., for example. An image within an image capturing range is displayed on the display unit 120 by the image capturing unit 110.

The display unit 120 is a liquid-crystal display (LCD), a plasma display, a vacuum fluorescent display, a light-emitting diode display (LED), a field emission display (FED), and/or other suitable displays, for example. The disclosure here is not intended to limit the type of the display unit 120. In addition, the display unit 120 may also be a touch control screen that is integrated with a touch control module; however, it should be understood that the invention is not limited thereto.

The communication unit 130 is a third generation (3G) mobile communication module, a general packet radio service (GPRS) module, or a Wi-Fi module, etc., for example. Accordingly, the handheld electronic apparatus 100 is capable of communicating with a controllable device through the communication unit 130.

The storage unit 140 is a fixed or a movable random access memory (RAM) in any form, a read-only memory (ROM), a flash memory, a hard disc, other similar devices, or a combination of the foregoing, for example.

The processing unit 150 is, for example, a central processing unit (CPU) or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices.

The processing unit 150 detects a digital stamp in the image. Moreover, the processing unit 150 displays a control interface corresponding to the digital stamp at a position of the image, which corresponds to the digital stamp, and detects an operation action the user executes on the control interface, so as to control one single or a plurality of controllable devices corresponding to the digital stamp through the communication unit 130.

More specifically, the digital stamp is provided in advance in each of the controllable devices. Moreover, the digital stamp may also be set for a designated space. The digital stamp of the designated space corresponds to one or multiple controllable devices in the designated space. For example, a digital stamp is disposed at a doorway, wherein the space inside the doorway serves as the designated space, and a plurality of electronic apparatuses in the designated space are set to be the controllable devices corresponding to this digital stamp.

After obtaining the image, the processing unit 150 detects whether the digital stamp exists in the image. In the situation of detecting that the digital stamp exists in the image, the processing unit 150 acquires the control interface corresponding to the digital stamp from a database, and then the control interface is displayed in the image instantly displayed by the display unit 120. For example, a layer of the control interface is overlaid on the image. The database is for example stored in the storage unit 140 and is established with information about each digital stamp and the corresponding control interface in advance.

Furthermore, in other embodiments, a sensing unit, capable of sensing the digital stamp, may also be disposed in the handheld electronic apparatus 100. The sensing unit is used to determine whether the digital stamp exists in the captured image. It should be noted that the disclosure here is not intended to limit the way the digital stamp is obtained.

Here, the storage unit 140 stores a plurality of code snippets therein. The code snippets are executed by the processing unit 150 after being installed. The code snippets include a plurality of commands, by which the processing unit 150 executes a plurality of steps of a method for controlling an electronic apparatus (namely, controllable devices) thereunder. In this embodiment, the handheld electronic apparatus 100 includes only one processing unit 150. However, in other embodiments, the electronic apparatus 100 may include a plurality of processing units 150 used for executing the installed code snippets. The controlling method for the controllable devices is explained below with reference to the above descriptions of the handheld electronic apparatus 100.

Figure 2:
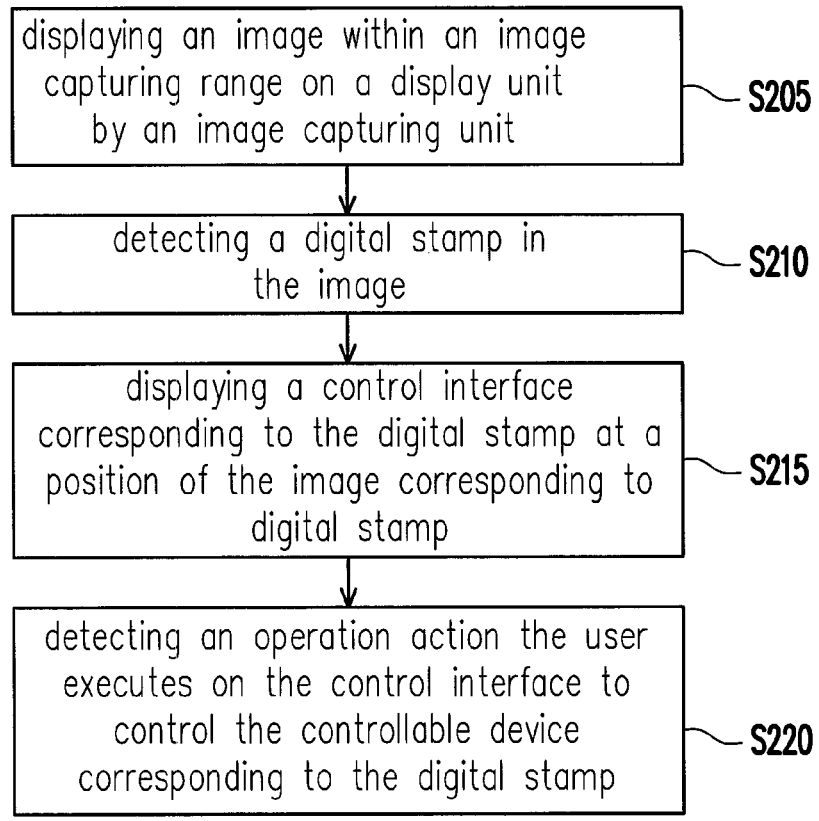
FIG. 2 is a flowchart illustrating a controlling method for controlling an electronic apparatus according to an embodiment of the invention.

FIG. 2 is a flowchart illustrating a controlling method for controlling an electronic apparatus according to an embodiment of the invention. With reference to FIG. 1 and FIG. 2, in Step S205, an image within an image capturing range is displayed in the display unit 120 by the image capturing unit 110. That is, the image capturing unit 110 is used to capture the image of a scene at the moment for displaying the image in the display unit 120.

Next, in Step S210, a digital stamp in the image is detected by the processing unit 150. For example, the processing unit 150 executes an image identification module to identify whether the digital stamp exists in the image. However, in other embodiments, the processing unit 150 may use a sensing unit to detect whether the digital stamp exists within the image capturing range. The disclosure here is not intended to limit the scope of the invention.

Thereafter, in Step S215, the processing unit 150 displays a control interface that corresponds to the digital stamp at a position of the image, which corresponds to digital stamp. Here, the control interface may be an icon, a pattern, a user interface with operation functions, or a virtual button, etc. For example, after the processing unit 150 detects the digital stamp included in the image, the processing unit 150 may inquire the database in the storage unit 140 to acquire the control interface corresponding to the digital stamp. Then, the processing unit 150 displays the control interface at the position of the image, which corresponds to the digital stamp.

Figure 3A:
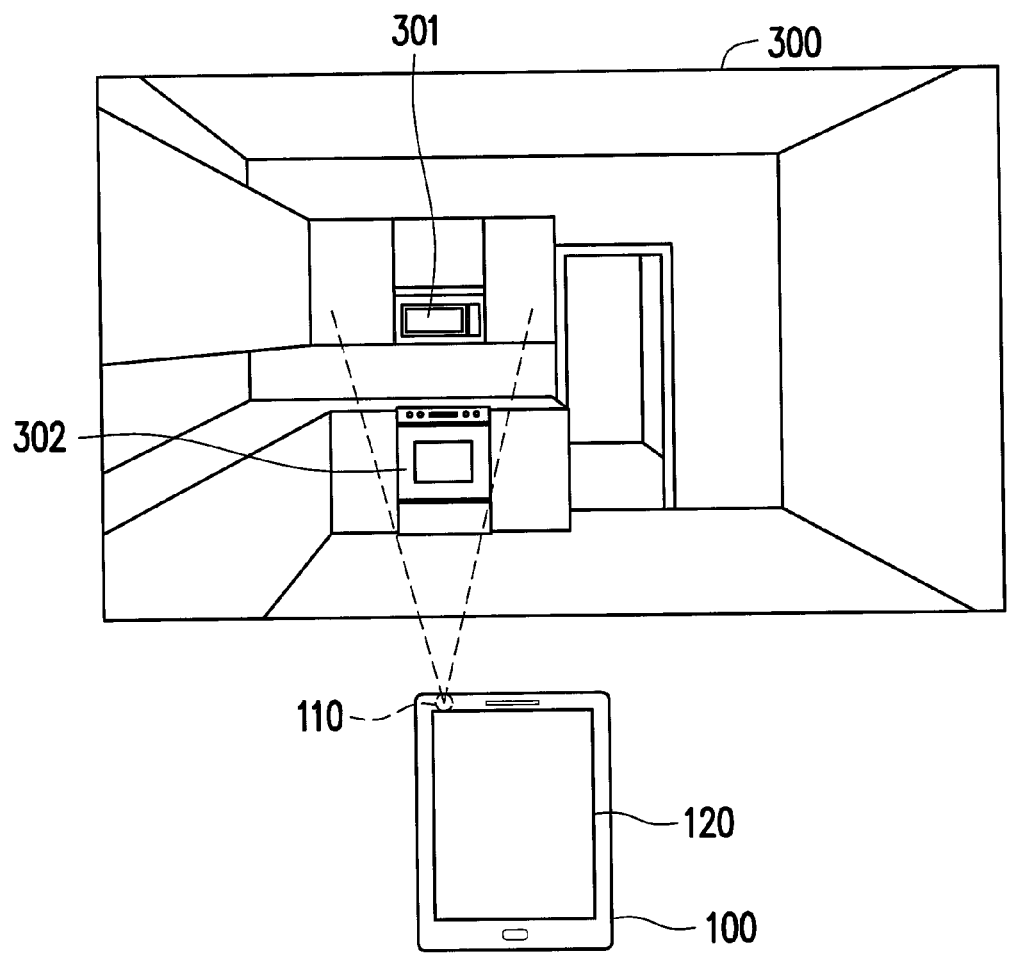
FIG. 3A and FIG. 3B are schematic diagrams of display control interfaces according to an embodiment of the invention.
Figure 3B:
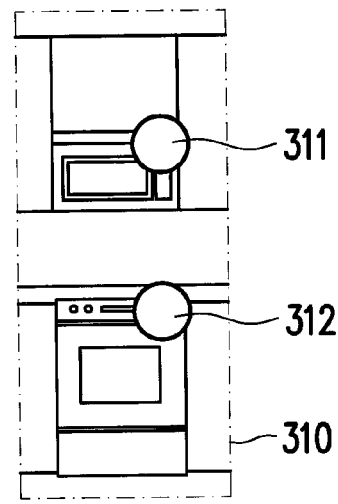

For instance, FIG. 3A and FIG. 3B are schematic diagrams of display control interfaces according to an embodiment of the invention. In this embodiment, a tablet computer serves as the handheld electronic apparatus 100, and a scene 300 includes controllable devices 301 and 302 that have the digital stamp (not shown).

In FIG. 3A, the user holds the handheld electronic apparatus 100 toward the scene 300 to obtain an image 310 of the scene within the image capturing range through the image capturing unit 110, as shown in FIG. 3B. The processing unit 150 for example utilizes the image identification module stored in the storage unit 140 to find digital stamps of the controllable device 301 and the controllable device 302 in the image 310. Thereafter, as shown in FIG. 3B, control interfaces 311 and 312 corresponding to the digital stamps are displayed at positions of the image 310, which correspond to the digital stamps.

Referring back to FIG. 2, in Step S220, the processing unit 150 detects an operation action the user executes on the control interface so as to control the controllable device corresponding to the digital stamp. For example, the operation action may be a zoom operation, a drag operation, a rotation operation, etc. That is, the user may perform reduction/enlarging operations, drag operation, or rotation operation on the control interface. Or, in the situation that the control interface provides operation functions, the user may also use the operation functions of the control interface directly.

For instance, when the processing unit 150 detects that the operation action is a start action, an enabling command is generated to enable power supply to the controllable device. When the processing unit 150 detects that the operation action is a shutdown action, a disabling command is generated to disable power supply to the controllable device. When the processing unit 150 detects that the operation action is a power adjustment action, a power dispatch command is generated to adjust power consumption of the controllable device. After the processing unit 150 detects the operation action, a corresponding command is generated and transmitted to the corresponding controllable device via the communication unit 130. Accordingly, the controllable device that receives the command executes a corresponding action. In addition, the processing unit 150 also transmits the command to a server for the server to control the controllable device.

With reference to FIG. 3A and FIG. 3B, below the control interfaces 311 and 312 are power consumption information patterns, for example, for illustrating how to use the control interfaces 311 and 312 to control the corresponding controllable devices 301 and 302. After the control interfaces 311 and 312 corresponding to the digital stamps are displayed on the image 310 as shown in FIG. 3B, the user is allowed to execute an operation action on the control interfaces 311 and 312.

The user may directly perform touch control on the control interfaces 311 and 312 displayed by the display unit 120 (e.g. touch control screen). For example, the control interface 311 or 312 may be removed, enlarged, or reduced, or the control interface 311 may be dragged to the control interface 312, etc.

When the processing unit 150 detects that the power consumption information pattern is dragged to overlay the other power consumption information pattern, such an action is determined as the power adjustment action. Here it is given that the processing unit 150 detects the control interface 311 being dragged to the control interface 312. Then, the processing unit 150 generates the power dispatch command to dispatch the power consumption of the controllable device 301 corresponding to the control interface 311 to the power consumption of the controllable device 302 corresponding to the control interface 312.

When the processing unit 150 detects that the power consumption information pattern is reduced or enlarged, such an action is determined as the power adjustment action. Here given that the control interface 311 being enlarged or reduced is detected, the processing unit 150 generates the power dispatch command to increase the power consumption of the controllable device 301 corresponding to the control interface 311 in accordance with the enlarging operation, or reduce the power consumption in accordance with the reduction operation.

When the processing unit 150 detects that the power consumption information pattern is removed, such an action is determined as the shutdown action. Here given that the control interface 312 being removed (e.g. being dragged to a recycle bin) is detected, the processing unit 150 generates the disabling command to disable the power supply to the controllable device 302 corresponding to the control interface 312. In the case that the control interface 312 has been removed, if the processing unit 150 detects that the control interface 312 is added, such an action is determined as the start action, and the processing unit 150 generates the enabling command to enable the power supply to the controllable device 302 corresponding to the control interface 312.

Moreover, the digital stamp may also be set corresponding to a designated space, so as to control controllable devices in the designated space simultaneously. In the situation of setting the digital stamp corresponding to the designated space, the processing unit 150 may simultaneously control multiple controllable devices in the designated space according to the operation action executed on the control interface belonging to the designated space. In addition, when the processing unit 150 detects that the operation action is an action of entering the designated space (e.g. quick double-click on the control interface), the image and a space frame corresponding to the designated space are displayed simultaneously. Moreover, if the designated space is not the scene that can be seen by the user at the moment, the processing unit 150 may further connecting to a remote image capturing unit corresponding to the designated space via the communication unit 130, so as to obtain the space frame of the designated space via the remote image capturing unit.

Figure 4:
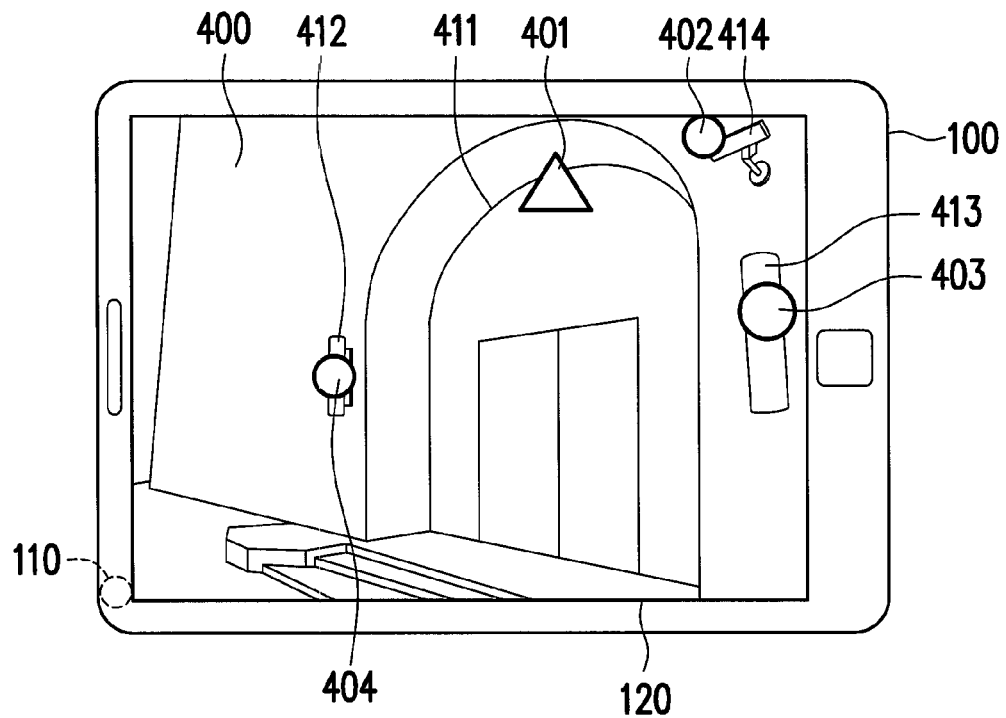
FIG. 4 is a schematic diagram of another display control interface according to an embodiment of the invention.

For instance, FIG. 4 is a schematic diagram of another display control interface according to an embodiment of the invention. In this embodiment, an actual scene includes four digital stamps, which are respectively disposed at a door 411, lamps 412 and 413 on two sides of the door 411, and a surveillance video camera 414.

In FIG. 4, the user uses the image capturing unit 110 of the handheld electronic apparatus 100 to capture the scene for displaying an image 400 on the display unit 120. The image 400 includes control interfaces 401, 402, 403, and 404, which respectively correspond to the following four controllable devices, namely, the door 411, the surveillance video camera 414, the lamp 413, and the lamp 412. In order to differentiate the control interface 401 from the other control interfaces 402, 403, and 404, the control interface 401 is represented by a shape different from those of the other control interfaces 402, 403, and 404. However, it should be noted that the above is merely one of the embodiments of the invention, and the invention is not limited thereto.

If the user quickly clicks on the control interface 411 twice, the processing unit 150 connects to a remote image capturing unit of the designated space (lobby space inside the door) and displays the space frame of the designated space, which is captured by the remote image capturing unit, on the display unit 120. For example, the image 400 and the space frame of the designated space may be simultaneously displayed in a picture in picture manner. The user for example may execute an operation action on the control interface 401 so as to simultaneously control all the controllable devices in the designated space. For instance, if the user executes the shutdown action on the control interface 401, the power supply to all the controllable devices in the designated space is disabled simultaneously.

Besides, the processing unit 150 may further detect whether a digital stamp exists in the space frame. If a digital stamp is detected, Step S215 and Step S220 as shown in FIG. 1 may be performed. Accordingly, the user is allowed to control the controllable devices in the designated space by means of the control interfaces on the space frame.

The aforementioned processing of the image and detection of the control interface may also be done by a cloud server, instead of the handheld electronic apparatus 100. Another example is given below.

Figure 5:
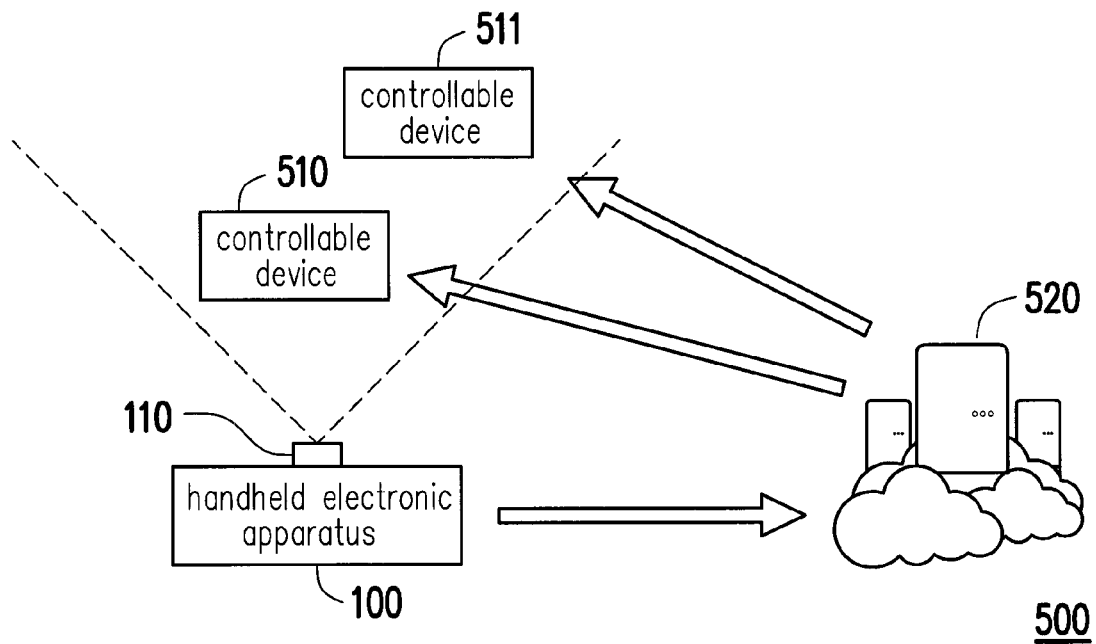
FIG. 5 is a schematic diagram of a monitoring system according to an embodiment of the invention.

FIG. 5 is a schematic diagram of a monitoring system according to an embodiment of the invention. With reference to FIG. 1 and FIG. 5, a monitoring system 500 includes a server 520 that serves as a cloud storage and processing system, the handheld electronic apparatus 100, and controllable devices 510 and 511. Here two controllable devices 510 and 511 are given as examples, but it should be noted that the number of the controllable devices is not limited thereto and may vary in other embodiments. The handheld electronic apparatus 100 controls the controllable devices 510 and 511 through the server 520 using cloud technology.

The controllable devices 510 and 511 may be smart sockets, smart household appliances with power consumption information transmission, etc. The handheld electronic apparatus 100 may be a mobile phone, a tablet computer, a personal digital assistant (PDA), a camera, etc., having the image capturing unit 110 and the display unit 120 and utilizing the image capturing unit 110 to capture an image within the image capturing range and display the image on the display unit 120.

The server 520 is a host having powerful computing capability, which receives the image from the handheld electronic apparatus 100 via the Internet. The server 520 detects the digital stamp in the image and displays the control interface corresponding to the digital stamp on the image of the display unit 120 of the handheld electronic apparatus 100 via the Internet (similar to FIG. 3B or FIG. 4 for example). Further, the handheld electronic apparatus 100 receives the operation action (e.g. start action, shutdown action, or power adjustment action, etc.) the user executes on the control interface and transmits the operation action to the server 520 for the server 520 to generate the corresponding command (e.g. enabling command, disabling command, or power dispatch command, etc.) according to the operation action, so as to control the controllable devices 510 and 511.

In addition, the handheld electronic apparatus 100 may further upload the power consumption of an operation habit of the user and a historical record thereof to the server 520 and provides such information to the user when the user executes the next operation, to optimize utilization of the power.

A situation of use of home electricity is described below as an example.

The controllable devices 510 and 511 have accepted a power consumption management system, that is, under monitoring and control of the server 520, and a power consumption management application has been installed to the handheld electronic apparatus 100. Thereafter, direct communication (e.g. device to device (D2D) communication technology, near field communication (NFC) technology, etc.) or indirect communication (through a tag or image identification, for example) between each of the controllable devices 510 and 511 under control and the handheld electronic apparatus 100 is activated, and after identification, the handheld electronic apparatus 100 interacts with the cloud server 520 directly.

The user may point the image capturing unit 110 of the handheld electronic apparatus 100 toward a specific space (e.g. the living room) to capture an image. Here, an identity verification login action may be further set, for example, to remind the user to input identity information of the user. After the user's identity is verified, the display unit 120 not only presents the image of the living room, which includes all the controllable devices under control (e.g. television, home audio and video system, lamps, fans, air conditioning, etc.) but also overlays power consumption information patterns (i.e. control interfaces) as image objects on the image at positions near the respective controllable devices that are under control. After observing the current power consumption, the user may directly operate the control interfaces of the controllable devices by touch so as to control the respective controllable devices.

For example, the server 520 may simultaneously control the controllable devices 510 and 511 according to the operation action performed on the control interfaces belonging to the designated space. Further, with the controllable device 510 as the detected object, when it is detected that the operation action is the start action, the server 520 generates the enabling command so as to enable the power supply to the controllable device 510. When it is detected that the operation action is the shutdown action, the server 520 generates the disabling command so as to disable the power supply to the controllable device 510. When it is detected that the operation action is the power adjustment action, the server 520 generates the power dispatch command so as to adjust the power consumption of the controllable device 510.

Below two exemplary situations are provided for illustrative purposes.

In Situation I, the invention is applied to a space of large area, such as a campus. The power consumption management application installed to the handheld electronic apparatus 100 is activated. Then, the image capturing unit 110 is used to capture the image of the campus, and the situation of the campus and each monitored area (i.e. the designated space) are displayed on the display unit 120. The designated space may include areas such as the administration building, information building, business building, technology building, parking lot, playground, basketball court, or swimming pool, etc. Here, the corresponding control interface (i.e. the power consumption information pattern) is not yet displayed in each designated space.

If the user executes a click operation with respect to the parking lot area (e.g. touching the parking lot area with his finger), the power consumption information pattern of the light of the parking lot is shown on the display unit 120. The user may reduce or enlarge the power consumption information pattern with his finger, such that the light of the parking lot becomes darker with the reduction of the power consumption information pattern and becomes brighter with the enlargement of the power consumption information pattern. Moreover, the degree and speed of the variation of the light are proportional to the reduction and enlargement of the power consumption information pattern.

If the user executes a click operation with respect to the basketball court area, the power consumption information pattern of the light of the basketball court is shown on the display unit 120. The user may drag the power consumption information pattern to the recycle bin with his finger or remove the power consumption information pattern in other ways. In that case, the light of the basketball court is turned off as the power consumption information pattern is removed. If the user wishes to turn on the light of the basketball court, the user may select "add", for example, to display the power consumption information pattern of the light of the basketball court again on the display unit 120.

In addition, it is given that the swimming pool is being drained or filled with water at night, and the user intends to unload power consumption of the administration building for modulation. If the user may execute a click operation with respect to the administration building area to show the power consumption information pattern of the light of the administration building. Then, the user executes a click operation with respect to the swimming pool area to show the power consumption information pattern of the light of the swimming pool. Following that, the user moves the power consumption information pattern of the administration building into the power consumption information pattern of the swimming pool with his finger (or by other ways such as dragging) to make the two power consumption information patterns overlap and integrate with each other. Values of the two power consumption data will be recalculated and displayed.

In Situation II, the invention is applied to a building. The power consumption management application installed to the handheld electronic apparatus 100 is activated. The image capturing unit 110 is used to capture an image of the building, and the image of a scene related to the building is displayed on the display unit 120. Moreover, the control interface corresponding to the building is displayed on the image shown on the display unit 120. Accordingly, the user may click on the control interface to display a perspective view of floors of the building. Each of the floors may have a control interface corresponding thereto, and the user may perform control actions, such as adjustment of brightness of the light and adjustment of air conditioning, etc., for a specific floor. After the perspective view of the floors of the building is displayed, the user may further select a specific floor to display a floor plan view thereof. Each designated space (e.g. office, equipment room, public area, warehouse, etc.) in the floor plan view may have a control interface corresponding thereto, and the user may perform control actions, such as adjustment of brightness of the light and adjustment of air conditioning, etc., for one specific designated space.

To conclude the above, in the aforementioned embodiments, real-time image overlaying and interactive operation of augmented reality (AR) are introduced to effectively combine the real scenes with virtual objects (control interface) so as to achieve a more user-friendly interface for intellectual instant operations and generate a 3D visual presentation. In addition, by integrating instant image capturing of the handheld electronic apparatus with the technology of augmented reality (AR) to perform real-time interaction, clear and intuitive operations become possible and the risk of misjudgment is significantly reduced. Furthermore, mobility of the management device is increased and the management device is able to handle more instant information to achieve more complicated interactive scene modes.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A controlling method of an electronic apparatus, adapted for a handheld electronic apparatus, the controlling method comprising:
   displaying an image within an image capturing range on a display unit by an image capturing unit;
   detecting a digital stamp in the image, wherein the digital stamp corresponds to a single or a plurality of controllable devices;
   displaying a power consumption information pattern corresponding to the digital stamp at a position of the image, which corresponds to the digital stamp;
   detecting an operation action a user executes on the power consumption information pattern to control power supply or power consumption of the single or the plurality of controllable devices corresponding to the digital stamp;
   generating a disabling command to disable power supply to the single or the plurality of controllable devices when detecting that the operation action is to remove the power consumption information pattern;
   after removing the power consumption information pattern, generating an enabling command to enable power supply to the single or the plurality of controllable devices when detecting to add the power consumption information pattern;
   generating a first power dispatch command to dispatch the power consumption of the controllable device corresponding to the power consumption information pattern to the controllable device corresponding to another power consumption information pattern when detecting that the operation action is to drag the power consumption information pattern to overlay the another power consumption information pattern; and
   generating a second power dispatch command to decrease or increase the power consumption of the controllable device corresponding to the power consumption information pattern when detecting that the operation action is to reduce or enlarge the power consumption information pattern.

2. The controlling method according to claim 1, wherein in a situation that the digital stamp corresponds to the plurality of controllable devices, the plurality of controllable devices are located in a designated space, and the step of detecting the operation action the user executes on the power consumption information pattern comprises:
   simultaneously controlling the plurality of controllable devices according to the operation action executed on the power consumption information pattern that belongs to the designated space.

3. The controlling method according to claim 1, wherein in a situation that the digital stamp corresponds to the plurality of controllable devices, the plurality of controllable devices are located in a designated space, and after the step of detecting the operation action the user executes on the power consumption information pattern, the controlling method further comprises:
   simultaneously displaying the image and a space frame corresponding to the designated space when detecting that the operation action is an action of entering the designated space.

4. The controlling method according to claim 3, wherein when detecting that the operation action is the action of entering the designated space, the controlling method further comprises:
   connecting to a remote image capturing unit corresponding to the designated space to obtain the space frame by the remote image capturing unit.

5. The controlling method according to claim 1, wherein, after the step of detecting the operation action the user executes on the power consumption information pattern, the controlling method further comprises:
   generating a command; and
   transmitting the command to a server for the server to control the single or the plurality of controllable devices according to the command.

6. The controlling method according to claim 1, wherein, after the step of detecting the operation action the user executes on the power consumption information pattern, the controlling method further comprises:
   generating a command; and
   transmitting the command to the single or the plurality of controllable devices for the single or the plurality of controllable devices to execute a corresponding action according to the command.

7. A handheld electronic apparatus, comprising:
   a display unit;
   an image capturing unit displaying an image within an image capturing range on the display unit;
   a communication unit communicating with a single or a plurality of controllable devices; and
   a processing unit coupled to the display unit, the image capturing unit, and the communication unit, wherein the processing unit detects a digital stamp corresponding to the single or the plurality of controllable devices in the image, displays a power consumption information pattern corresponding to the digital stamp at a position of the image corresponding to the digital stamp, detects an operation action the user executes on the power consumption information pattern, so as to control power supply or power consumption of the single or the plurality of controllable devices corresponding to the digital stamp by the communication unit, generates a disabling command to disable power supply to the single or the plurality of controllable devices when detecting that the operation action is to remove the power consumption information pattern, generates an enabling command to enable power supply to a single or the plurality of controllable devices when detecting that the operation action is to add the power consumption information pattern, generates a first power dispatch command to dispatch the power consumption of the controllable device corresponding to the power consumption information pattern to the controllable device corresponding to another power consumption information pattern when detecting that the operation action is to drag the power consumption information pattern to overlay the another power consumption information pattern, and generates a second power dispatch command to decrease or increase the power consumption of the controllable device corresponding to the power consumption information pattern when detecting that the operation action is to reduce or enlarge the power consumption information pattern.

8. The handheld electronic apparatus according to claim 7, wherein, in a situation that the digital stamp corresponds to the plurality of controllable devices, the plurality of controllable devices are located in a designated space, and the processing unit simultaneously controls the plurality of controllable devices according to the operation action executed on the power consumption information pattern belonging to the designated space.

9. The handheld electronic apparatus according to claim 7, wherein, in a situation that the digital stamp corresponds to the plurality of controllable devices, the plurality of controllable devices are located in a designated space;
when the processing unit detects that the operation action is an action of entering the designated space, the processing unit connects to a remote image capturing unit corresponding to the designated space by the communication unit to simultaneously display the image and a space frame corresponding to the designated space, wherein the space frame is obtained by the remote image capturing unit.

10. The handheld electronic apparatus according to claim 7, wherein the processing unit generates a command by detecting the operation action executed on the power consumption information pattern and transmits the command to a server by the communication unit for the server to control the single or the plurality of controllable devices according to the command.

11. A monitoring system, comprising:
a plurality of controllable devices each comprising a digital stamp respectively;
a handheld electronic apparatus displaying an image within an image capturing range on a display unit by an image capturing unit; and
a server receiving the image from the handheld electronic apparatus via an Internet;
wherein the server detects the digital stamp in the image and displays a power consumption information pattern corresponding to the digital stamp on the image of the display unit of the handheld electronic apparatus via the Internet, and the handheld electronic apparatus receives an operation action a user executes on the power consumption information pattern and transmits the operation action to the server for the server to generate a command according to the operation action, so as to control power supply or power consumption of the controllable devices,
wherein the server generates a disabling command to disable power supply to one of the controllable devices when detecting that the operation action is to remove the power consumption information pattern, generates an enabling command to enable power supply to one of the controllable devices when detecting that the operation action is to add the power consumption information pattern, generates a first power dispatch command to dispatch the power consumption of one of the controllable device corresponding to the power consumption information pattern to the one of the controllable devices corresponding to another power consumption information pattern when detecting that the operation action is to drag the power consumption information pattern to overlay the another power consumption information pattern, and generates a second power dispatch command to decrease or increase the power consumption of one of the controllable devices corresponding to the power consumption information pattern when detecting that the operation action is to reduce or enlarge the power consumption information pattern.

12. The monitoring system according to claim 11, wherein, in a situation that the controllable devices are located in a designated space and the designated space further comprises another digital stamp, the server simultaneously controls the controllable devices according to the operation action executed on the power consumption information pattern belonging to the designated space.

* * * * *